UNITED STATES PATENT OFFICE.

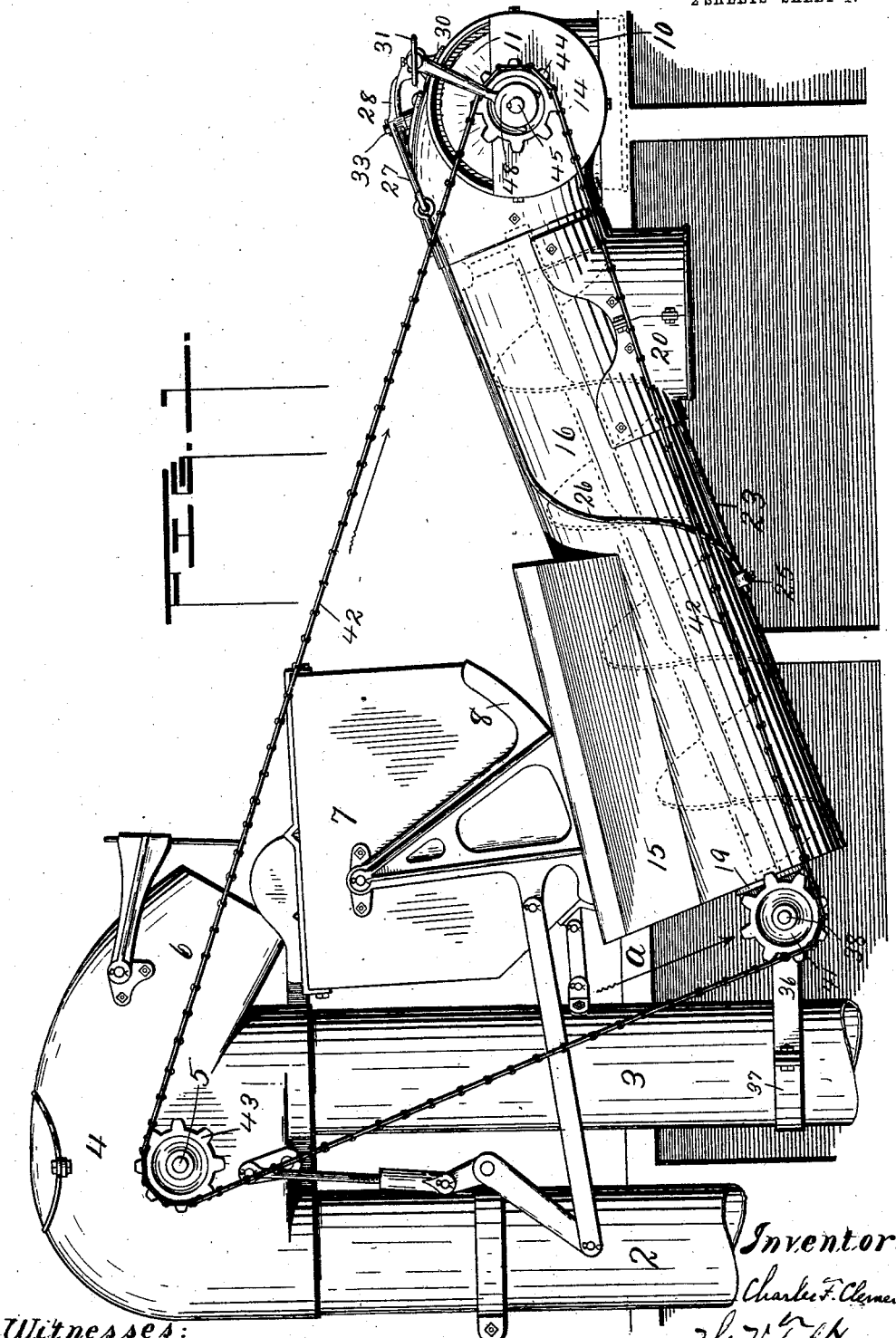

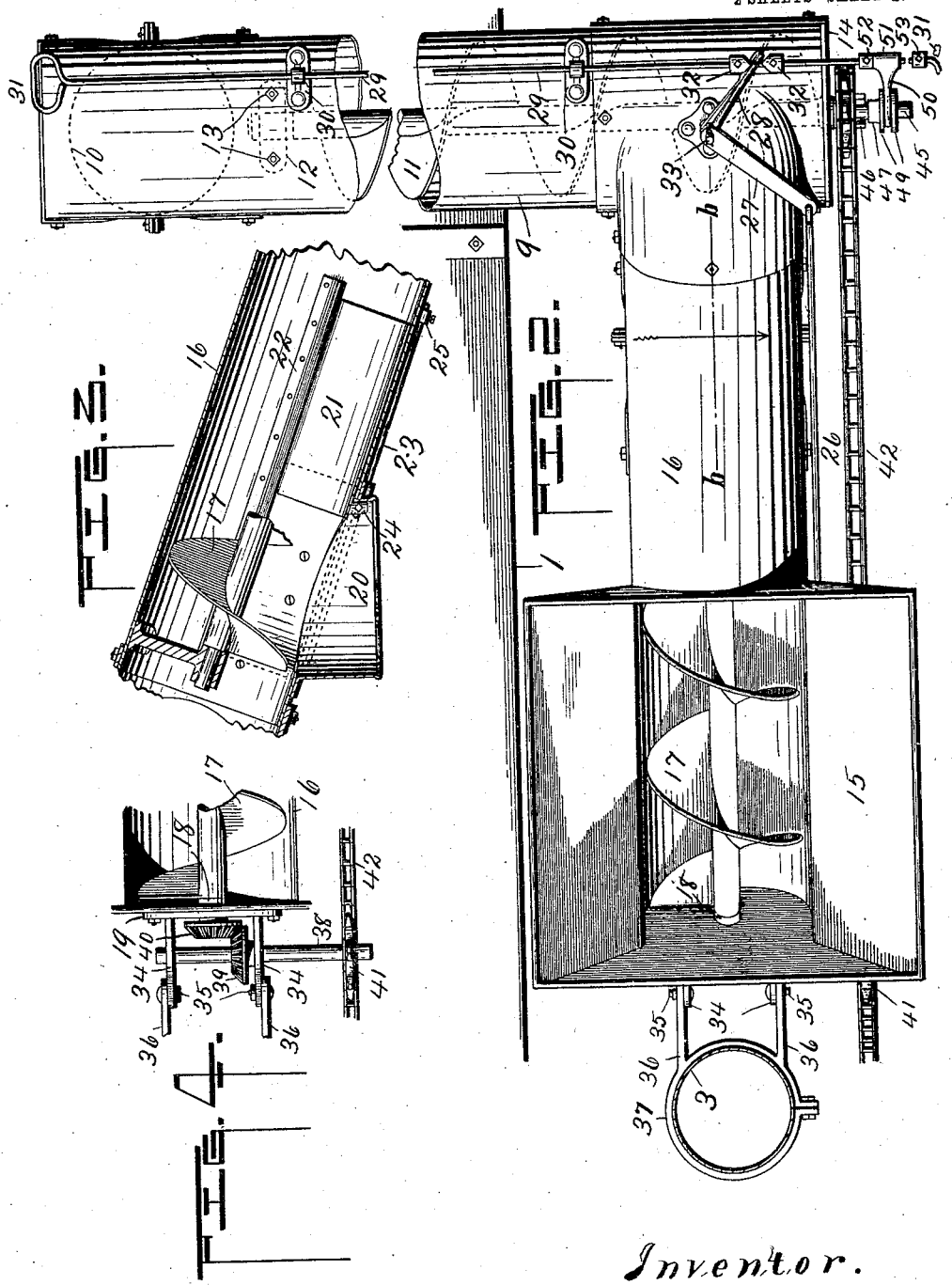

CHARLES F. CLEMENTS, OF PEORIA, ILLINOIS.

CONVEYER.

No. 859,900.     Specification of Letters Patent.     Patented July 9, 1907.

Application filed October 5, 1906. Serial No. 337,543.

*To all whom it may concern:*

Be it known that I, CHARLES F. CLEMENTS, a citizen of the United States, residing at Peoria, in the county of Peoria and State of Illinois, have invented certain new and useful Improvements in Conveyers; and I do hereby declare that the following is a full, clear, and exact description of the invention, which will enable others skilled in the art to which it appertains to make and use the same.

This invention has reference more particularly to a grain conveying apparatus to be used in connection with threshing machines, for receiving grain from a grain weighing device and conveying the same to a cross conveyer on the threshing machine.

As is known, it is desirable to deliver grain at both sides of the threshing machine, and this is usually accomplished by providing a cross conveyer which extends transversely across the top of the threshing machine and is arranged to be controlled by the operator to discharge at either end thereof, as desired. The cross conveyer commonly used is provided with a hopper at one end thereof, to receive the grain, which is usually supplied to the hopper from an elevator located at the side of the threshing machine.

When a grain weighing device is used, which is very common, it is necessary that the elevator extend a considerable distance above the top of the threshing machine so as to deliver into the bucket of the grain weighing device and so that the bucket of the grain weighing device may discharge into the hopper of the cross conveyer. With this construction, however, the elevator extends a considerable distance above the top of the threshing machine and usually above all other portions and accessory parts of the threshing machine. This is undesirable and often very inconvenient.

The object of my invention is to provide means whereby the elevator and weighing device may be mounted on the threshing machine in a lower position than in the construction above mentioned, and the grain delivered therefrom be conveyed to a cross conveyer on the top of the threshing machine.

In the accompanying drawings, which illustrate my invention, Figure 1 is a side view of the upper portion of a threshing machine showing my invention applied thereto; Fig. 2 a top view of the cross conveyer and inclined conveyer communicating therewith; Fig. 3 a vertical sectional view on the line *b—b* of Fig. 2 looking in the direction indicated by the arrow, a portion of the auger being broken away to show the valve which controls the intermediate outlet from the inclined conveyer; and Fig. 4 a view of the mechanism by which the inclined conveyer is operated, said view being taken looking as indicated by the arrow *a* in Fig. 1.

1, of the drawings, indicates a portion of the frame structure of a threshing machine, at the side of which is carried an elevator for carrying the grain from the lower part of the threshing machine to a point of convenient delivery above the top thereof. This elevator is of a common construction and has the tubes 2 and 3 which are connected to the head 4 of the elevator. The usual chain carried flights or buckets (not shown) travel up the tube 2 around the shaft 5 and down the tube 3 and in operation raise the grain and throw it out through the spout 6 of the head of the elevator.

7 is the weighing bucket of any suitable grain weighing device, which said bucket is suspended beneath the spout of the elevator in such position to receive all the grain discharged therefrom and said bucket is operated to weigh the grain delivered thereinto and discharge same after being weighed through an opening in bottom thereof, which said opening is normally closed by the gate or valve 8, all of which is old in the art and is readily understood.

Mounted on the top of the threshing machine is a cross conveyer which comprises the tube or duct 9 which extends transversely across the top of the threshing machine and projects a short distance beyond the sides thereof. On the opposite side of the threshing machine from the elevator and weighing device, the tube or duct 9 is provided with the large downwardly projecting discharge opening or spout 10 indicated by dotted lines in Fig. 3, and there is provided the auger 11 which extends longitudinally through the tube or duct 9 from the opposite end thereof to within a short distance of the discharge opening or spout 10, as is shown by dotted lines in Fig. 3, and this said auger is carried at the end adjacent the discharge opening or spout 10 and at intervals throughout its length if desired, by means of the bracket bearing shown by dotted lines at 12, which is secured to the tube or duct as at 13. The auger 11 extends from the bearing 12 to the opposite end of the tube or duct 9, where the stem thereof is reduced and extends through a bearing in the plate 14 which closes the end of the tube or duct 9.

On the opposite side of the threshing machine from the discharge opening or spout 10 is an inclined elevating conveyer which connects to the cross conveyer at the end and extends beneath the bucket 7 of the weighing device and is provided with a hopper 15 to receive the grain as it is discharged from the weighing bucket. This inclined elevator comprises the large tube or duct 16 which is closed at the lower end and connected at the upper end with the tube or duct 9 of the cross conveyer somewhat above the bottom thereof so that the grain as it is delivered to the cross conveyer from the inclined elevating conveyer will have a slight fall into the bottom of the cross conveyer. The hopper 15 which extends somewhat above the tube or duct 16 of the inclined elevating conveyer, delivers into the interior thereof and the rear wall thereof may lie in the same plane with the lower end of the tube or duct 16 as shown in the drawings. This tube or duct 16 has the auger 17 which extends from the lower end of the tube or duct 16 to within a short distance of the cross conveyer as is shown by full lines in Fig. 3 and by dotted lines in Fig. 1, and at the lower end has the stem projecting through a bearing 18 in the plate 19 secured to the lower end of the tube or duct 16.

In the bottom of the tube or duct 16, adjacent the connection thereof with the cross conveyer, is a large discharge opening or spout 20 which is controlled by the valve 21. This valve consists of a semicircular member which slides in the ways 22, one on each side of the interior of tube or duct 16 so as to be capable of being moved to cover the discharge opening or spout 20 or to be moved to uncover said opening. As is apparent, when the valve 21 is open, the grain as it is pushed upward in the tube or duct 16 by the auger therein, will readily fall through said opening and consequently will not be carried up into the cross conveyer. When the valve is closed, however, the grain will be delivered into the end of the cross conveyer and when the auger in the cross conveyer is in operation will be carried through the tube or duct 9 across the threshing machine and discharged through the discharge opening or spout 10. For operating the valve 21, there is provided a short rod 23 which extends through the wall of the discharge opening or spout 20 and is connected to the projection 24 from the bottom of the upper end of the valve 21. This rod 23 is connected at its lower end by means of the twin collar member 25 to the end of the rod 26 which is bent upwardly as shown in Fig. 1 and connected to the long arm 27 of a bell crank which is pivoted on the top of the cross conveyer at the end thereof. The other arm 28 of the bell crank is flattened at the end and provided with a slot through which passes the rod 29, which is carried by the brackets 30, extends from end to end of the cross conveyer and is provided with a handle 31 at each end. On the said rod at each side of the flattened terminal of the arm 28 of the bell crank is a pointed collar 32 which is arranged to engage the arm of the bell crank in the movement of the rod 29 for swinging said bell crank on its pivot 33. As is apparent, when the rod 29 is pushed or drawn toward the discharge opening or spout 10 of the cross conveyer, the bell crank will be swung on the pivot 33 and will, through the medium of the rods 26 and 23, move the valve 21 to close discharge opening or spout 20, and when the said rod 29 is moved in the inverse direction, the said valve will be moved in a similar manner to open the said discharge opening or spout.

The inclined elevating conveyer is supported at its lower end by means of the pair of arms or extensions 34 from the plate 19 on the end of the tube or duct 16, which said arms or extensions are pivoted by means of the bolts 35 or otherwise to a corresponding pair of arms or extensions 36 from the collar 37, which is clamped around the adjacent tube 3 of the elevator. Through the arms or extensions 34 intermediate of their juncture with the arms or extensions 36 and the end of the inclined conveyer is passed the short shaft 38 which is provided intermediate of said arms with the beveled gear 39 thereon, which meshes with the beveled gear 40 on the exposed end of the stem of the auger 17. On the outer end of said shaft is provided the sprocket 41 around which is passed the chain 42 which is also passed over a sprocket 43 on the shaft 5 in the head of the elevator, and the sprocket 44 on the protruding end 45 of the auger stem of the cross conveyer. Thus, it will be seen that when the elevator is in operation, the inclined elevating conveyer and the sprocket 44 will be continuously driven and the pitch of the flights of the augers of the inclined conveyer and the cross conveyer are such that the auger of the inclined conveyer operates to carry grain from the lower end thereof to the upper outlet end thereof, and the auger of the cross conveyer operates to carry grain from the end at which the inclined conveyer is connected to the opposite end thereof.

As is apparent, when the valve 21 is open, the grain which is being carried upward in the inclined conveyer by the auger 17 will all fall through the discharge opening or spout 20. It will then be unnecessary for the auger of the cross conveyer to be driven. For this reason, the sprocket 44 on the protruding stem 45 of the cross conveyer is carried loosely thereon and is provided with the clutch lugs 46 which are adapted to be engaged by the clutch lugs 47 of the clutch member 48. This clutch member is keyed on the shaft 45 so as to rotate therewith and be axially movable thereon and is provided with the annular flanges 49, between which projects the bifurcated end of the arm 50, the prongs of which loosely straddle the reduced body portion of the clutch member 48 intermediate of the flanges 49 and permit revolution thereof independent of said arm. This clutch member is provided at the end opposite the bifurcated end with the tubular portion 51 which is perforated so that the rod 29 may pass loosely therethrough. On the rod 29, at each side of the tubular portion 51 of the arm 50 are provided the collars 52 and 53 which are adjusted thereon so that said collars strike the tubular portion 51 of the clutch arm just before the said rod 29 reaches its limit of movement and shifts the clutch arm in the direction in which the rod is being moved.

From the foregoing, it appears that as the rod 29 is shifted from the position shown in the drawings, the said rod slides through the perforation in the tubular portion of the clutch arm 50 and gradually swings the bell crank on the pivot 33 to close the valve 21 to cover the opening 20. As the rod 29 nears its limit of movement, in which the valve 21 is closed, the tubular portion 51 of the clutch arm is engaged by the adjustable collar 53 and moved in the direction in which the rod is being shifted and carries with it the clutch member 48 and forces the clutch lugs thereof into engagement with the clutch lugs 46 on the sprocket 44 thus connecting the auger with the constantly driven sprocket and causing the operation of the same.

What I claim is:

1. The combination with a threshing machine, of a cross conveyer thereon, a conveyer at the side of the threshing machine arranged to discharge into the cross conveyer, a discharge outlet from the latter conveyer intermediate of the inlet end thereof and the outlet therefrom into the cross conveyer, a valve for controlling said outlet and means operative from each side of the threshing machine for operating said valve.

2. The combination with a threshing machine, of a cross conveyer thereon, an inclined elevating conveyer arranged to discharge into the cross conveyer and a valve controlled discharge outlet from said inclined elevating conveyer intermediate of the inlet end thereof and the outlet therefrom into the cross conveyer.

3. The combination with a threshing machine, of a cross conveyer on the top of the threshing machine extending from side to side thereof, an inclined elevating conveyer at one side of the threshing machine arranged to discharge into the cross conveyer at one end thereof, and a valve controlled discharge outlet from said elevating conveyer intermediate of the inlet end thereof and the discharge outlet therefrom into the cross conveyer.

4. The combination with a threshing machine, of a cross conveyer thereon extending from side to side thereof, an inclined elevating conveyer at one side of the threshing machine arranged to discharge into the cross conveyer at one end thereof, a discharge outlet from the cross conveyer at the opposite end thereof, a discharge outlet from the inclined elevating conveyer, a valve for controlling said outlet from the inclined elevating conveyer, and means operative from each side of the threshing machine for shifting said valve to open and close said outlet.

5. The combination with a threshing machine, of a cross conveyer thereon extending from side to side thereof, an inclined elevating conveyer at one side of the threshing machine arranged to discharge into one end of the cross conveyer, an outlet from the opposite end of the cross conveyer, an outlet from the inclined elevating conveyer intermediate of the inlet end thereof and the discharge outlet therefrom into the cross conveyer, a valve for controlling said outlet from the inclined elevating conveyer, and means for operating said valve from each side of the threshing machine to open and close said outlet.

6. The combination with a threshing machine, of a cross conveyer thereon extending from side to side thereof, an inclined tubular member communicating with said cross conveyer and provided with a receiving hopper at the lower end thereof, an auger operative in said tubular member for conveying material from the lower end of said tubular member to the upper end thereof into the cross conveyer, and a valve controlled discharge opening in the bottom of said tubular member.

7. The combination with a threshing machine, of a cross conveyer extending from side to side thereof, comprising a tubular duct and an auger operative within said tubular duct, an inclined elevating conveyer communicating with said cross conveyer at one end thereof, comprising a tubular member connected at the upper end with the tubular duct of the cross conveyer and provided with a receiving hopper at the lower end thereof, an auger extending longitudinally of said tubular member, a discharge outlet from the tubular duct of the cross conveyer at the opposite end thereof, from the connection of the inclined conveyer therewith, means for operating the auger in the inclined conveyer for carrying material from the lower inlet end thereof to the upper end thereof into the cross conveyer, means for operating the auger of the cross conveyer for conveying material from the inlet end thereof to the opposite outlet end thereof, a discharge opening in the bottom of the inclined conveyer intermediate of the inlet end thereof, and the discharge opening therefrom into the cross conveyer, a valve for said discharge opening and means operative from each side of the threshing machine for operating said valve to open and close said discharge opening.

8. The combination with a threshing machine, of a power driven cross conveyer extending from side to side of the threshing machine, a power driven inclined elevating conveyer arranged to discharge into said cross conveyer at one end thereof, a discharge opening from said cross conveyer at the opposite end thereof, a discharge outlet in the inclined elevating conveyer, a valve for said discharge opening in the inclined elevating conveyer and means operative from each side of the threshing machine for operating said valve to open and close the discharge outlet, said means being arranged to simultaneously throw the cross conveyer into operation when the valve is closed and to throw the cross conveyer out of operation when the valve is open.

9. The combination with a threshing machine, of a grain weighing device at the side thereof, an elevator for furnishing grain to the weighing device, a conveyer extending from side to side of the threshing machine, a conveyer communicating with the cross conveyer for delivering grain from the weighing device to the cross conveyer and a grain delivery outlet from the grain weighing mechanism intermediate of the weighing device and the cross conveyer.

10. The combination with a threshing machine, of a grain weighing device at the side thereof, an elevator for furnishing grain to the weighing device, a conveyer extending from side to side of the threshing machine, an inclined elevating conveyer for delivering grain from the grain weighing device to the cross conveyer and a valve controlled discharge outlet from the said inclined elevating conveyer intermediate of the inlet thereto and the outlet therefrom into the cross conveyer.

11. The combination with a threshing machine, of a grain weighing device and elevator for furnishing grain to the grain weighing device, both located at one side of the threshing machine, a cross conveyer on top of the threshing machine and an elevating conveyer arranged to convey the grain delivered from the said weighing device to the said cross conveyer.

12. The combination with a threshing machine, of a grain weighing device and elevator for furnishing grain to the grain weighing device, both located at one side of the threshing machine, a cross conveyer on top of the threshing machine extending from side to side thereof, and an inclined elevating conveyer arranged to receive the grain delivered from the said grain weighing device in the lower end thereof and convey said grain to the cross conveyer.

13. The combination with a threshing machine, of a grain weighing device at the side thereof, an elevator for furnishing grain to the weighing device, a conveyer communicating with the cross conveyer for delivering grain from the weighing device to the cross conveyer, a grain delivery outlet from the grain conveying mechanism intermediate of the weighing device and the cross conveyer, a valve for controlling the said delivery outlet and means for operating said valve from each side of the threshing machine.

14. The combination with a threshing machine, of a grain weighing device at the side thereof, an elevator for furnishing grain to the weighing device, a conveyer extending from side to side of the threshing machine, an inclined elevating conveyer for delivering grain from the grain weighing device to the cross conveyer, a discharge outlet in the bottom of the inclined elevating conveyer, intermediate of the inlet end thereof and the outlet therefrom to the cross conveyer, a valve for controlling said discharge opening, and means operative from each side of the threshing machine for opening and closing said valve.

15. The combination with a threshing machine, of a grain weigher device at the side thereof, a valve for furnishing grain to the weighing device, a power conveyer extending from side to side of the threshing machine, an inclined elevating conveyer for delivering grain from the grain weighing device to the cross conveyer, a discharge opening in the bottom of the inclined elevating conveyer, a valve for controlling the said discharge outlet, a clutch for throwing the cross conveyer into and out of operation and means operative from each side of the threshing machine for operating the said clutch and operating the valve in the inclined conveyer.

In testimony whereof I have affixed my signature, in presence of two witnesses.

C. F. CLEMENTS.

Witnesses:
  W. B. WILDE,
  MATILDA H. DERSCH.